(12) United States Patent
Luan et al.

(10) Patent No.: US 11,845,684 B1
(45) Date of Patent: Dec. 19, 2023

(54) WATER CONSERVANCY CONSTRUCTION SEWAGE TREATMENT MECHANISM

(71) Applicants: Hohai University, Nanjing (CN); Hebei University of Engineering, Hebei Province (CN); ZHANGHE UPSTREAM ADMINISTRATION BUREAU, Handan (CN)

(72) Inventors: Qinghua Luan, Nanjing (CN); Qiuyan Lian, Nanjing (CN); Chao Lin, Nanjing (CN); Jiajun Chen, Nanjing (CN); Hongkai Bi, Nanjing (CN); Changhao Zhang, Nanjing (CN); Zhihong Zhang, Nanjing (CN); Bin Li, Nanjing (CN); Haibo Wang, Nanjing (CN)

(73) Assignees: HOHAI UNIVERSITY, Nanjing (CN); HEBEI UNIVERSITY OF ENGINEERING, Handan (CN); ZHANGHE UPSTREAM ADMINISTRATION BUREAU, Handan (CN)

( * ) Notice: Subject to any disclaimer, the term of this patent is extended or adjusted under 35 U.S.C. 154(b) by 0 days.

(21) Appl. No.: 18/296,900

(22) Filed: Apr. 6, 2023

(30) Foreign Application Priority Data

Nov. 2, 2022 (CN) .......................... 202211358991.1

(51) Int. Cl.
*B01D 21/24* (2006.01)
*B01D 21/00* (2006.01)
*C02F 9/20* (2023.01)

(52) U.S. Cl.
CPC .............. *C02F 9/20* (2023.01); *B01D 21/245* (2013.01); *B01D 21/2444* (2013.01); *B01D 21/0045* (2013.01); *B01D 21/2405* (2013.01)

(58) Field of Classification Search
CPC ... C02F 9/20; B01D 21/2444; B01D 21/0042; B01D 21/0045; B01D 21/245; B01D 21/2405
See application file for complete search history.

(56) References Cited

FOREIGN PATENT DOCUMENTS

| CN | 101580292 A | 11/2009 |
|---|---|---|
| CN | 210905160 U | 7/2020 |
| CN | 216379876 U | 4/2022 |

(Continued)

*Primary Examiner* — Terry K Cecil
(74) *Attorney, Agent, or Firm* — MUNCY, GEISSLER, OLDS & LOWE, P.C.

(57) ABSTRACT

Water conservancy construction sewage treatment mechanism, including a support mounting cylinder, where a variable-diameter sedimentation cylinder is arranged at one end of the support mounting cylinder, one half of the cylinder wall of the support mounting cylinder is a thin wall and the other half is a thick wall, and the thin wall and the thick wall are disposed oppositely. The water conservancy construction sewage treatment mechanism also includes: a variable-diameter diversion cylinder, which is arranged on the thin wall at the other end of the support mounting cylinder; several displacement diversion modules, which are arranged on the thick wall of the support mounting cylinder and include guide displacement structures and combined diversion structures; and a magnetic attraction displacement adjusting structure, which is arranged on the outer side of the thick wall of the support mounting cylinder and is matched with the guide displacement structures and the combined diversion structures.

1 Claim, 6 Drawing Sheets

(56) References Cited

FOREIGN PATENT DOCUMENTS

| | | |
|---|---|---|
| CN | 114644371 A | 6/2022 |
| CN | 217003416 U | 7/2022 |
| JP | H05285485 A | 11/1993 |

WATER CONSERVANCY CONSTRUCTION SEWAGE TREATMENT MECHANISM

TECHNICAL FIELD

The present invention relates to the field of sewage treatment, in particular to a water conservancy construction sewage treatment mechanism.

BACKGROUND

Sewage treatment is the process of purifying sewage to meet the water quality requirements of being discharged into a certain water body or reused. Sewage treatment is widely used in construction, agriculture, transportation, energy, petrochemical, environmental protection, urban landscape, medical treatment, catering, and other fields. Sewage treatment methods include: physical methods of separating insoluble substances in sewage mainly by means of physical actions, without changing the chemical properties in the process of treatment; biological methods of decomposing and oxidizing dissolved or colloidal organic matters in sewage into stable inorganic substances by using the metabolic function of microorganisms, so as to purify the sewage; and chemical methods of treating or recovering dissolved or colloidal substances in sewage by means of chemical reactions.

The construction of water conservancy projects is one of the basic constructions for the survival and development of a country. With the increasing development of society, people gradually pay attention to the importance of environmental protection. In the process of regular desilting of the river, the extracted sewage and silt being directly discharged into the river will cause damage and pollution to the downstream water quality, thus it is necessary to purify the sewage.

Current related equipment for water conservancy construction sewage treatment is difficult to achieve continuous diversion in a standing area, and is difficult to achieve combined multi-layer synchronous diversion, that is, it is impossible to realize refined sewage treatment operations. Meanwhile, integrated structural parts are mostly used, which is obviously insufficient in adaptability and maintainability.

SUMMARY

The purpose of the present invention is to provide a water conservancy construction sewage treatment mechanism to solve the problems raised in the above background art.

To achieve the above object, the present invention provides the following technical solutions:

A water conservancy construction sewage treatment mechanism, including a support mounting cylinder, a variable-diameter sedimentation cylinder being arranged at one end of the support mounting cylinder, where one half of the cylinder wall of the support mounting cylinder is a thin wall and the other half is a thick wall, and the thin wall and the thick wall are disposed oppositely; the water conservancy construction sewage treatment mechanism also including:
 a variable-diameter diversion cylinder, which is arranged on the thin wall at the other end of the support mounting cylinder to decelerate the sewage that flows in at a high speed;
 a partition being arranged on the support mounting cylinder on one side of the variable-diameter diversion cylinder;
 several displacement diversion modules, which are arranged on the thick wall of the support mounting cylinder and include guide displacement structures and combined diversion structures; and a magnetic attraction displacement adjusting structure, which is arranged on the outer side of the thick wall of the support mounting cylinder and is worked with the guide displacement structures and the combined diversion structures to achieve displacement liquid pumping operations at different depths.

As a further solution of the present invention: a discharge pipe is arranged on the outer end of the variable-diameter sedimentation cylinder, a diversion valve is arranged inside the discharge pipe, and several support mounting holders are arranged on the outer side of the variable-diameter sedimentation cylinder.

As a further solution of the present invention: several buffer plates are arranged at equal intervals inside the variable-diameter diversion cylinder, buffer holes are provided in all the buffer plates, and a connecting flange is arranged on the outer end of the variable-diameter diversion cylinder.

As a further solution of the present invention: each guide displacement structure includes a limit guide groove arranged in the thick wall of the support mounting cylinder, a limit guide column is provided in conjunction with the limit guide groove, and the limit guide column is connected with a displacement mounting rack towards the inner side of the support mounting cylinder.

As a further solution of the present invention: damping guide columns are arranged symmetrically on the inner side of the limit guide grooves, and the limit guide columns are provided with damping guide sleeves in conjunction with the damping guide columns.

As a further solution of the present invention: each combined diversion structure includes a displacement mounting plate, each displacement mounting rack is connected to the displacement mounting plate via a drive telescopic part, a diversion mounting cover is arranged in the middle of one side of the displacement mounting plate in a directly facing manner, the diversion mounting cover is provided with a filter screen, several positioning columns are arranged on the side of the diversion mounting cover directly facing the displacement mounting plate, the displacement mounting plate is provided with positioning grooves in conjunction with the positioning columns, and buckles are arranged between the positioning columns and the positioning grooves.

As a further solution of the present invention: a diversion pump is arranged inside each diversion mounting cover, the diversion pumps are all provided with diversion tubes in an extension manner, and the diversion tubes all extend out of the support mounting cylinder through the partition.

As a further solution of the present invention: the magnetic attraction displacement adjusting structure includes a displacement magnetic absorption plate, which is arranged on the outside of the support mounting cylinder by directly facing the limit guide grooves, a conductive column is arranged on one end of the displacement magnetic absorption plate, and a conductive groove is fit on the cylinder wall of the support mounting cylinder.

As a further solution of the present invention: a displacement screw cylinder is arranged on the side of the displacement magnetic absorption plate not facing the support mounting cylinder, a displacement stud is provided in conjunction with the displacement screw cylinder, both ends of the displacement stud are provided with drive units, and both the drive units are fixed on the outside of the support mounting cylinder via mounting racks.

As a further solution of the present invention: the limit guide grooves is through till it's end by the partition, and the portion of the support mounting cylinder outside the limit guide grooves is a plastic part.

Compared with the prior art, the present invention has the beneficial effects as follows:

Incoming sewage will cause no excessive interference to internal standing environment by means of multi-stage buffering, so that continuous standing diversion is guaranteed;

A plurality of groups of sewage at different depths can be drained by means of a plurality of groups of magnetic attraction lifting adjusting diversion structures, which is suitable for the diversion of simple sedimentation and drug-dosed flocculent and the diversion of settlement, so that a wider range of work is provided, and the sewage treatment precision is remarkably improved;

By using the combined structure, the operation freedom degree of the device is improved, and the maintainability is also remarkably improved.

1, support mounting holder; 2, discharge pipe; 3, diversion valve; 4, variable-diameter sedimentation cylinder; 5, displacement mounting plate; 6, support mounting cylinder; 7, buffer plate; 8, variable-diameter diversion cylinder; 9, partition; 10, diversion tube; 11, displacement stud; 12, buckle; 13, positioning column; 14, positioning groove; 15, displacement screw cylinder; 16, displacement magnetic absorption plate; 17, limit guide column; 18, displacement mounting rack; 19, drive telescopic part; 20, diversion pump; 21, diversion mounting cover; 22, filter screen; 23, conductive column; 24, conductive groove; 25, limit guide groove; 26, damping guide sleeve; 27, damping guide column; and 28, plastic part.

DETAILED DESCRIPTION

Embodiments of the present invention are described in detail below, examples of which are shown in the accompanying drawings, wherein the same or similar reference numerals designate the same or similar elements or elements having the same or similar functions throughout. The embodiments described below by referring to the accompanying drawings are exemplary and intended to explain the present invention, and should not be construed as limiting the present invention.

The following disclosure provides many different embodiments or examples for implementing different structures of the present invention. To simplify the disclosure of the present invention, components and arrangements of specific examples are described below, which, certainly, are only examples and not intended to limit the present invention. In addition, the present invention may repeat reference numerals and/or letters in different examples. Such repetition is for the purpose of simplicity and clarity and does not in itself indicate a relationship between the various embodiments and/or arrangements discussed.

Embodiment 1

Figure 1:
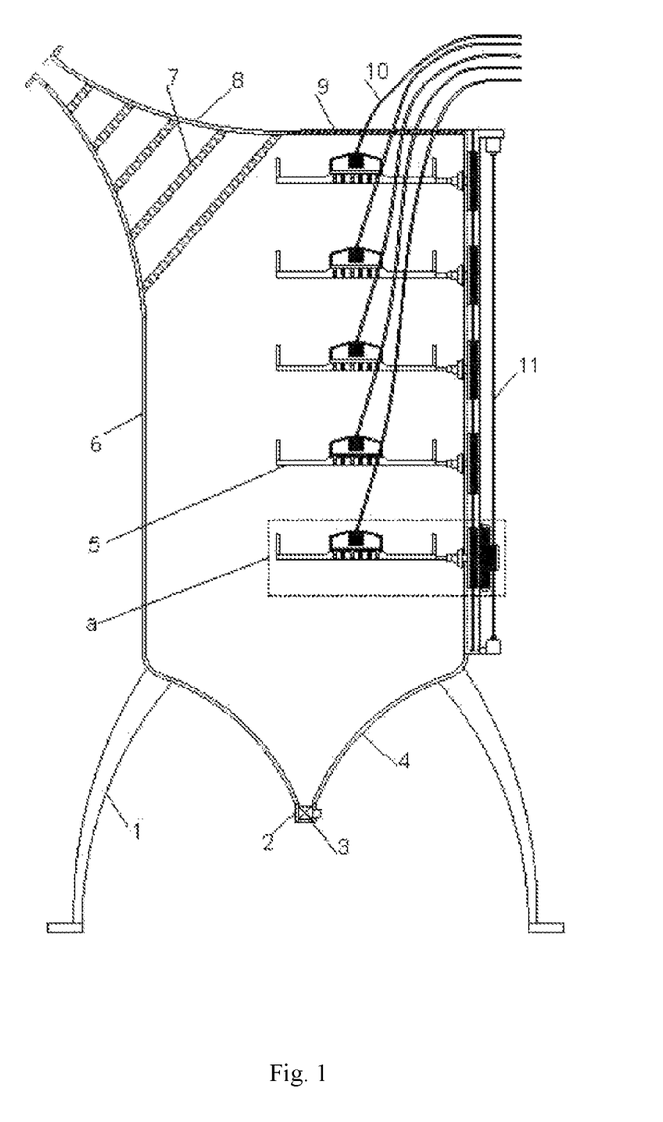
FIG. 1 is a schematic structural diagram of a water conservancy construction sewage treatment mechanism.
Figure 2:
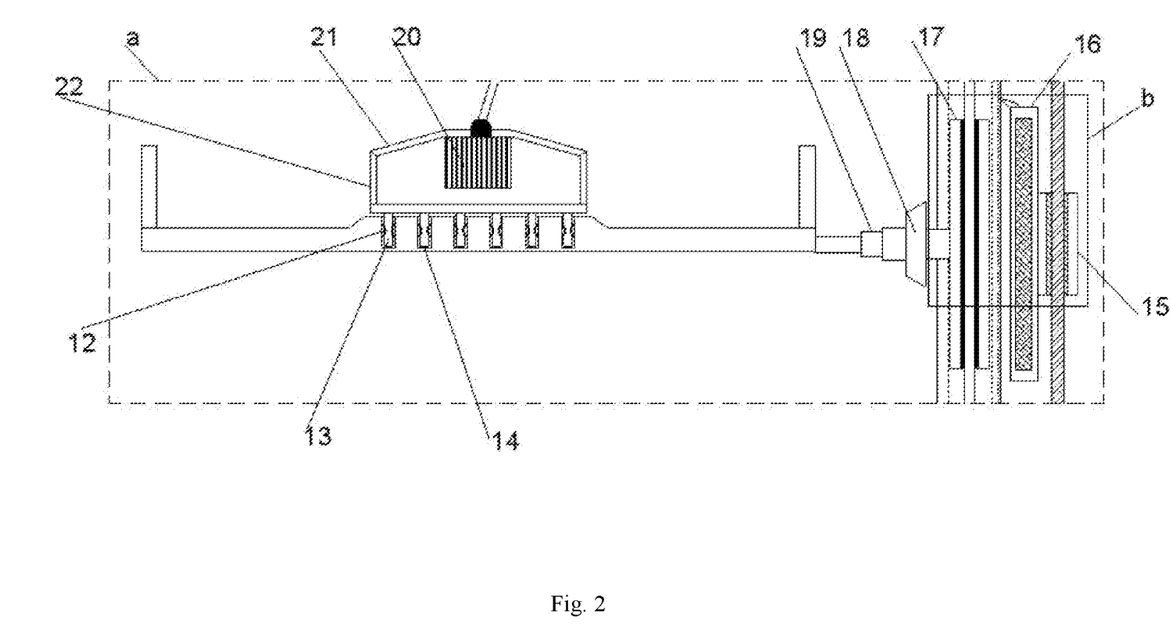
FIG. 2 is an enlarged schematic diagram of a in FIG. 1.
Figure 3:
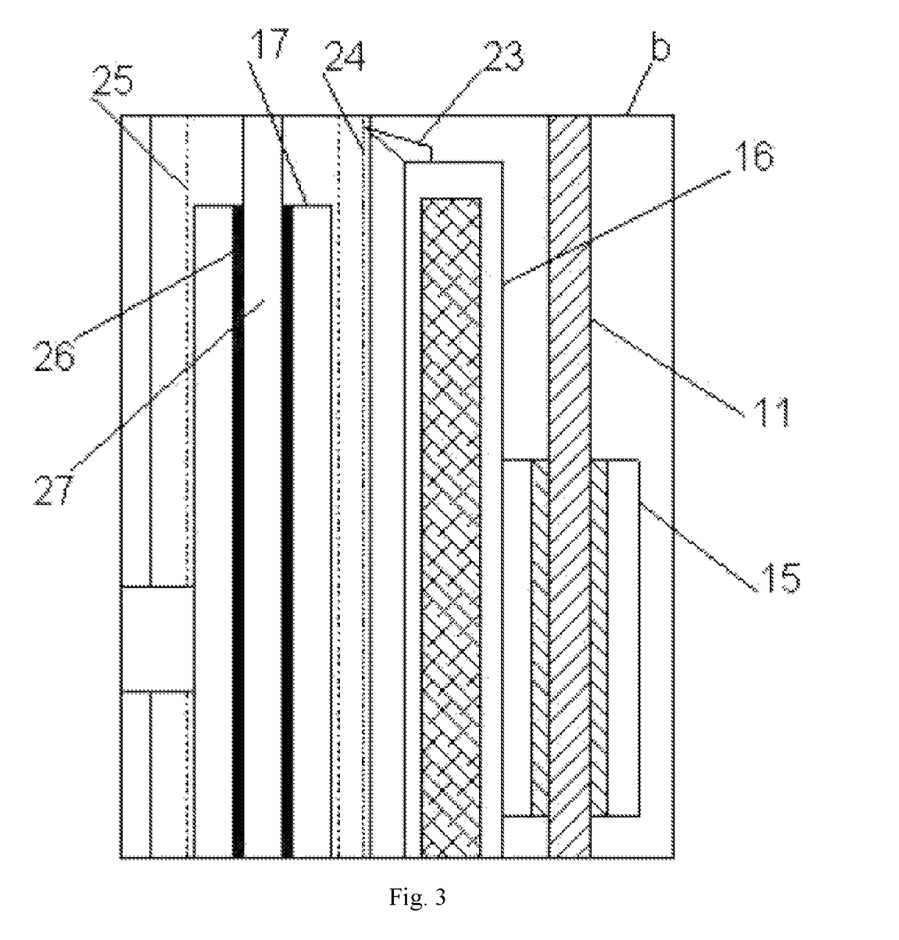
FIG. 3 is an enlarged schematic diagram of b in FIG. 2.
Figure 4:
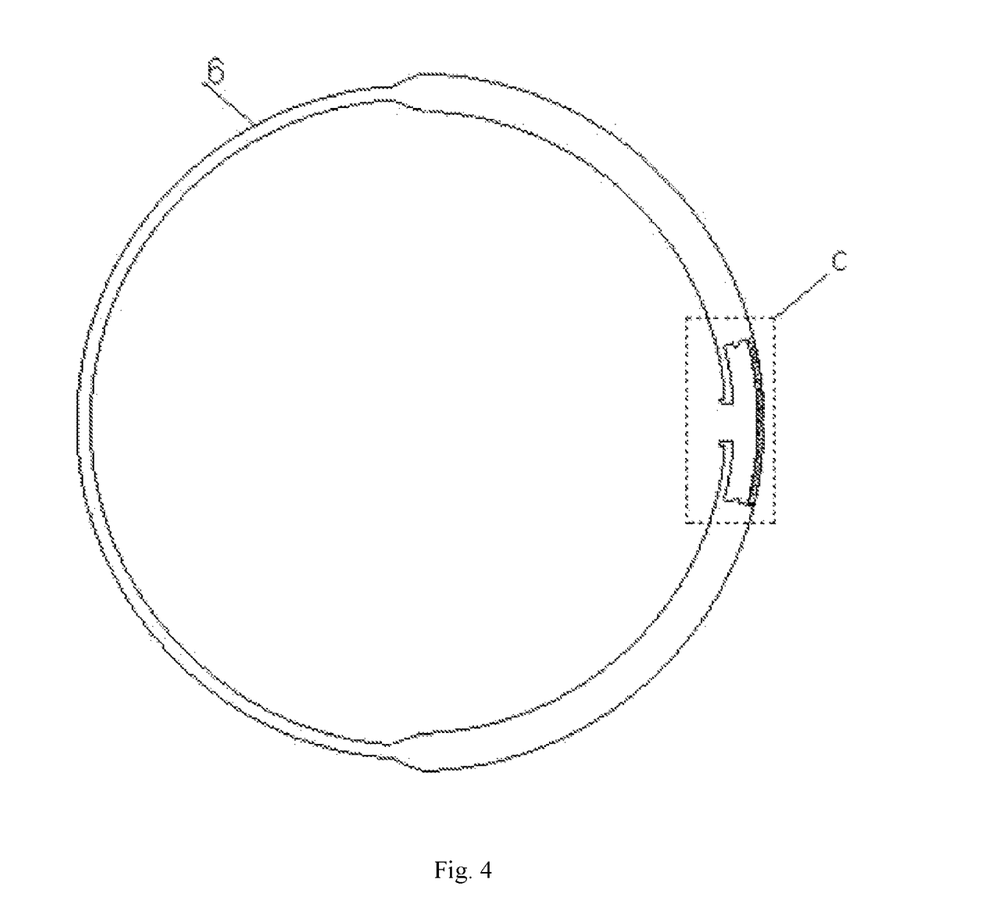
FIG. 4 is a schematic cross-sectional diagram of a support mounting cylinder in a water conservancy construction sewage treatment mechanism.
Figure 5:
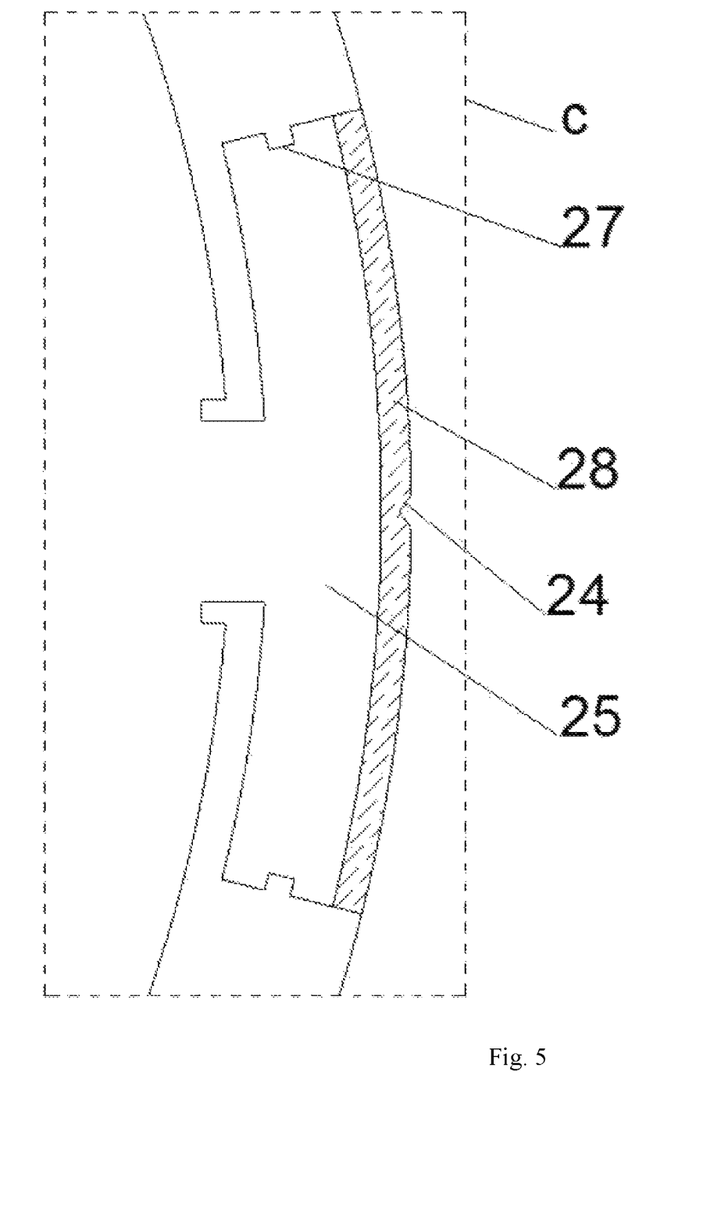
FIG. 5 is an enlarged schematic diagram of c in FIG. 4.
Figure 6:
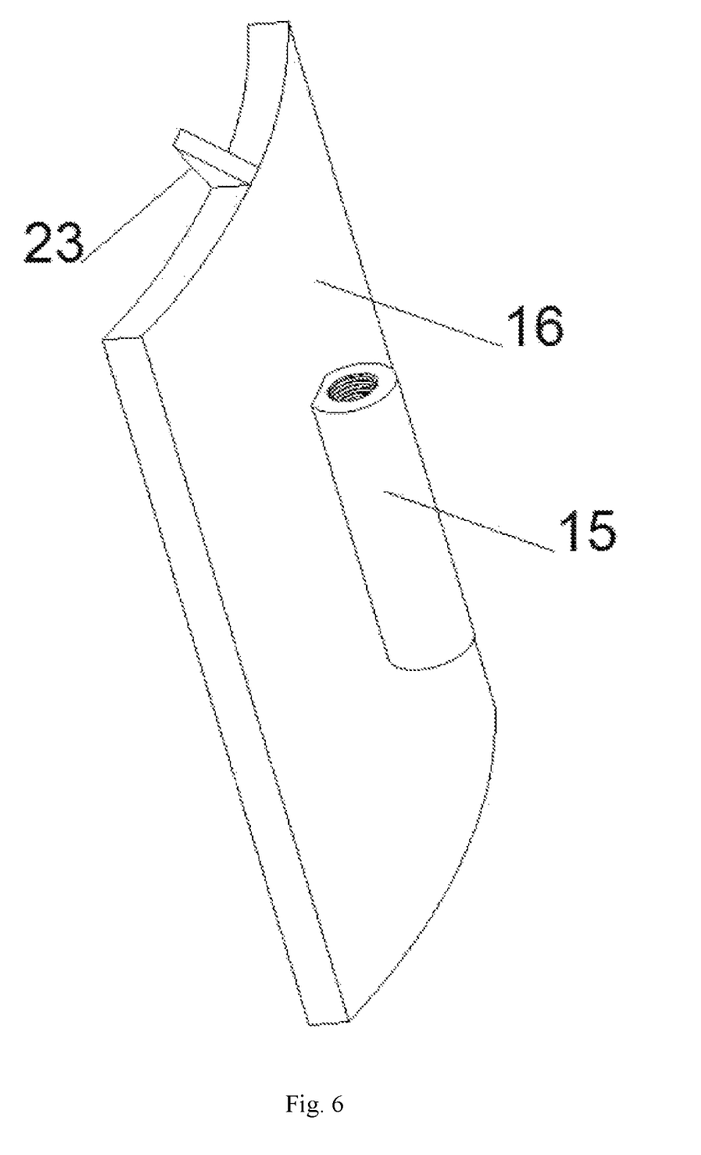
FIG. 6 is a three-dimensional schematic diagram of a displacement magnetic absorption plate in a water conservancy construction sewage treatment mechanism.

Please referring to FIGS. 1-6, in the embodiments of the present invention, a water conservancy construction sewage treatment mechanism includes a support mounting cylinder 6, where a variable-diameter sedimentation cylinder 4 is arranged at one end of the support mounting cylinder 6, a discharge pipe 2 is arranged on the outer end of the variable-diameter sedimentation cylinder 4, a diversion valve 3 is arranged inside the discharge pipe 2, several support mounting holders 1 are arranged on the outer side of the variable-diameter sedimentation cylinder 4, one half of the cylinder wall of the support mounting cylinder 6 is a thin wall and the other half is a thick wall, and the thin wall and the thick wall are disposed oppositely; the water conservancy construction sewage treatment mechanism also includes: a variable-diameter diversion cylinder 8, which is arranged on the thin wall at the other end of the support mounting cylinder 6 to decelerate the sewage that flows in at a high speed, where a partition 9 is arranged on the support mounting cylinder 6 on one side of the variable-diameter diversion cylinder 8; several displacement diversion modules, which are arranged on the thick wall of the support mounting cylinder 6 and include guide displacement structures and combined diversion structures; and a magnetic attraction displacement adjusting structure, which is arranged on the outer side of the thick wall of the support mounting cylinder 6 and is worked with the guide displacement structures and the combined diversion structures to achieve displacement liquid pumping operations at different depths.

Sewage is introduced into the support mounting cylinder 6 through the variable-diameter diversion cylinder 8, and is then precipitated in the support mounting cylinder 6 and the variable-diameter sedimentation cylinder 4. According to the treatment requirements of different types of sewage, displacement diversion modules of corresponding number are selected, mounted by means of the guide displacement structures, and adjusted to a target depth by using the magnetic attraction displacement adjusting structure. After standing for a period of time, diversion is carried out, a fine sewage treatment is carried out synchronously, and finally, the sediment is drained from the discharge pipe 2.

Embodiment 2

On the basis of Embodiment 1, please referring to FIG. 1, FIG. 2, FIG. 4 and FIG. 5, in the embodiments of the present invention, several buffer plates 7 are arranged at equal intervals inside the variable-diameter diversion cylinder 8, buffer holes are provided in all the buffer plates 7, a connecting flange is arranged on the outer end of the variable-diameter diversion cylinder 8, each guide displacement structure includes a limit guide groove 25 arranged in the thick wall of the support mounting cylinder 6, the limit guide grooves 25 is through till it's end by the partition 9, the portion of the support mounting cylinder 6 outside the limit guide grooves 25 is a plastic part 28, a limit guide column 17 is provided in conjunction with the limit guide groove 25, the limit guide column 17 is connected with a displacement mounting rack 18 towards the inner side of the support mounting cylinder 6, damping guide columns 27 are arranged symmetrically on the inner side of the limit guide grooves 25, the limit guide columns 17 are provided with damping guide sleeves 26 in conjunction with the damping guide columns 27, each combined diversion structure includes a displacement mounting plate 5, each displacement mounting rack 18 is connected to the displacement mounting plate 5 via a drive telescopic part 19, a diversion mounting cover 21 is arranged in the middle of one side of the displacement mounting plate 5 in a directly facing manner, the diversion mounting cover 21 is provided with a filter screen 22, several positioning columns 13 are arranged on the side of the diversion mounting cover 21 directly facing the displacement mounting plate 5, the displacement mounting plate 5 is provided with positioning grooves 14 in conjunction with the positioning columns 13, buckles 12 are arranged between the positioning columns 13 and the positioning grooves 14, a diversion pump 20 is arranged inside each diversion mounting cover 21, the diversion pumps 20 are all provided with diversion tubes 10 in an extension manner, and the diversion tubes 10 all extend out of the support mounting cylinder 6 through the partition 9.

Displacement diversion modules of corresponding number are selected, guide mounting is realized with the cooperation of the limit guide columns 17 and the limit guide grooves 25, and then the adjustment of depth is realized under the action of the magnetic attraction displacement adjusting structure. At this time, the depth fixing of the displacement mounting rack 18 and the displacement mounting plate 5 is realized under the action of the damping guide columns 27 and the damping guide sleeves 26, and the sewage at this depth is drained driven by the diversion pump 20, so that the drainage of sewage at different depths is achieved.

The positioning columns 13 cooperate with the positioning grooves 14, and the mounting of the guide installation covers is realized under the action of the buckles 12, which is convenient for quick replacement of the diversion pump 20 and improves maintainability.

Embodiment 3

On the basis of Embodiment 1, please referring to FIG. 1, FIG. 2, FIG. 3 and FIG. 6, in the embodiments of the present invention, the magnetic attraction displacement adjusting structure includes a displacement magnetic absorption plate 16, which is arranged on the outside of the support mounting cylinder 6 by directly facing the limit guide grooves 25, a conductive column 23 is arranged on one end of the displacement magnetic absorption plate 16, a conductive groove 24 is fit on the cylinder wall of the support mounting cylinder 6, a displacement screw cylinder 15 is arranged on the side of the displacement magnetic absorption plate 16 not facing the support mounting cylinder 6, a displacement stud 11 is provided in conjunction with the displacement screw cylinder 15, both ends of the displacement stud 11 are provided with drive units, and both the drive units are fixed on the outside of the support mounting cylinder 6 via mounting racks.

Driven by the drive units, the displacement stud 11 is matched with the displacement screw cylinder 15 to realize the position adjustment of the displacement magnetic absorption plate 16. The conductive column 23 and the conductive groove 24 are slidably matched to realize coupling power supply and provide power to the displacement magnetic absorption plate 16. A control unit is provided in the displacement magnetic absorption plate 16 to control the turn-on of magnetic absorption, so that under the action of a magnetic force, the adjustment of working depth of the limit guide columns 17 and the diversion pump 20 located thereon is realized in the air.

The drive units can be motors or hydraulic shafts; and the control unit can be CX-01, CX-02 and CX-03.

In the description of the present specification, description of reference terms such as "one embodiment", "some embodiments", "examples", "specific examples", or "some examples" implies that specific features, structures, materials or characteristics described in conjunction with the embodiments or examples are included in at least one embodiment or example of the present invention. In the present specification, the schematic expression of the above terms does not necessarily refer to the same embodiment or example. Moreover, the specific features, structures, materials or characteristics described can be combined in any one or more embodiments or examples in a suitable manner. In addition, those skilled in the art can integrate and combine different embodiments or examples and features of different embodiments or examples described in this specification without conflicting with each other.

Although the embodiments of the present invention have been shown and described, those of ordinary skill in the art can understand that various changes, modifications, substitutions and modifications can be made to these embodiments without departing from the principle and spirit of the present invention. The scope of the invention is defined by the claims and their equivalents.

The invention claimed is:

1. A water conservancy construction sewage treatment mechanism, comprising a support mounting cylinder defining an axis, a variable-diameter sedimentation cylinder being arranged at one end of the support mounting cylinder, wherein one co-axial half of a cylinder wall of the support mounting cylinder is a thin wall and the other co-axial half is a thick wall, and the thin wall and the thick wall are disposed oppositely; the water conservancy construction sewage treatment mechanism also comprising:
  a variable-diameter diversion cylinder, which is arranged on the thin wall at the other end of the support mounting cylinder to decelerate the sewage that flows in at a high speed;
  a partition being arranged on the support mounting cylinder on one side of the variable-diameter diversion cylinder;
  several displacement diversion modules, which are arranged axially-spaced on the thick wall of the support mounting cylinder and comprise guide displacement structures and combined diversion structures;
  a magnetic attraction displacement adjusting structure, which is arranged on an outer side of the thick wall of the support mounting cylinder and is operated with the guide displacement structures and the combined diversion structures to achieve displacement liquid pumping operations at different depths;
  a discharge pipe is arranged on an outer end of the variable-diameter sedimentation cylinder, a diversion valve is arranged inside the discharge pipe, and several support mounting holders are arranged on an outer side of the variable-diameter sedimentation cylinder; several buffer plates are arranged at equal intervals inside the variable-diameter diversion cylinder, buffer holes are provided in all the buffer plates, and a connecting flange is arranged on an outer end of the variable-diameter diversion cylinder;
  each guide displacement structure comprises a limit guide groove arranged in the thick wall of the support mounting cylinder, a limit guide column is provided in conjunction with the limit guide groove, and the limit guide column is connected with a displacement mounting rack towards an inner side of the support mounting cylinder, damping guide columns are arranged symmetrically on an inner side of the limit guide grooves, and the limit guide columns are provided with damping guide sleeves in conjunction with the damping guide columns; each combined diversion structure comprises a displacement mounting plate, each displacement mounting rack is connected to the displacement mounting plate via a drive telescopic part, a diversion mounting cover is arranged in the middle of one side of the displacement mounting plate in a directly facing manner, the diversion mounting cover is provided with a filter screen, several positioning columns are arranged on the side of the diversion mounting cover directly facing the displacement mounting plate, the displacement mounting plate is provided with positioning grooves in conjunction with the positioning columns, and buckles are arranged between the positioning columns and the positioning grooves; a diversion pump is arranged inside each diversion mounting cover, the diversion pumps are all provided with a respective diversion tube and the diversion tubes all extend out of the support mounting cylinder through the partition; and the magnetic attraction displacement adjusting structure comprises a displacement magnetic absorption plate, which is arranged on an outside of the support mounting cylinder by directly facing the limit guide grooves, a conductive column is arranged on one end of the displacement magnetic absorption plate, and a conductive groove is fit on the cylinder wall of the support mounting cylinder, a displacement screw cylinder is arranged on a side of the displacement magnetic absorption plate not facing the support mounting cylinder, a displacement stud is provided in conjunction with the displacement screw cylinder, both ends of the displacement stud are provided with drive units, and both the drive units are fixed on the outside of the support mounting cylinder via mounting racks; the limit guide grooves extend to an end at the partition, and a portion of the support mounting cylinder outside the limit guide grooves is a plastic part.

\* \* \* \* \*